United States Patent [19]

Weyand

[11] Patent Number: 5,219,148
[45] Date of Patent: Jun. 15, 1993

[54] DISC VALVE

[75] Inventor: Manfred Weyand, Viersen, Fed. Rep. of Germany

[73] Assignee: Babcock Sempell AG, Korschenbroich, Fed. Rep. of Germany

[21] Appl. No.: 964,933

[22] Filed: Oct. 22, 1992

[30] Foreign Application Priority Data

Oct. 31, 1991 [DE] Fed. Rep. of Germany ....... 4135858

[51] Int. Cl.$^5$ .............................................. F16K 5/00
[52] U.S. Cl. ..................................... 251/175; 251/192
[58] Field of Search ................. 251/175, 180, 188, 192

[56] References Cited

U.S. PATENT DOCUMENTS

| 2,214,195 | 9/1940 | Frambley | 251/175 X |
| 2,792,019 | 5/1957 | Lieser | 251/175 X |
| 2,990,853 | 7/1961 | Sharp | 251/175 X |
| 3,203,249 | 8/1965 | Jentzseh et al. | 251/180 X |

Primary Examiner—John C. Fox
Attorney, Agent, or Firm—Lowe, Price, LeBlanc & Becker

[57] ABSTRACT

A disc valve, in which the rotatable control disc (34) is securely held against the fixed control disc (26) with limited forces even when the pressure differences are great. For that purpose, a piston (44) is integrally formed on the rear side of the rotatable control disc (26), which piston is acted upon via a housing channel (66, 72) by the pressure prevailing at the valve outlet (14). The effective pressure-loaded surface area of the piston (44) is slightly smaller than the surface areas of the rotatable control disc (34) that are acted upon by pressure passing through the fixed control disc (26).

14 Claims, 3 Drawing Sheets

DISC VALVE

BACKGROUND TO THE INVENTION

The invention relates to a disc valve.

Disc valves are known which comprise (a) a housing having an inlet and an outlet, and having formed in it a disc chamber in communication with the inlet and the outlet, (b) fixed and rotatable control discs which are arranged in the disc chamber, the discs being in contact with one another via cooperating sealing faces and each of the control discs being provided with at least one control opening, the control openings of the two control discs being continuously adjustable between an aligned open position and a non-aligned closed position, and (c) a device for biasing the rotatable control disc towards the fixed control disc.

Under normal conditions of use, the side of the rotatable control disc remote from the sealing face is acted upon by the inlet pressure, so that this control disc is securely pressed against the fixed control disc when the valve is closed. If there is a large pressure difference between the inlet and the outlet in such a valve, high friction forces are produced between the two control discs, particularly in large valves, and correspondingly powerful drives are needed to regulate the valve, which drives are not only expensive but also require a corresponding amount of space.

SUMMARY OF THE INVENTION

The present invention provides a disc valve of the type referred to above, in which the device by which the rotatable control disc is biassed towards the fixed control disc comprises:

(i) a piston which acts on the side of the rotatable control disc remote from the sealing face and which extends in a cylinder bore of the housing, and (ii) a connecting line which connects an operating space of the biasing device, defined by the cylinder bore and the piston, to the outlet of the housing.

The disc valve of the invention has the advantage that the rotatable control disc can be turned with little force, even when there is a large pressure difference between the valve inlet and the valve outlet, while nevertheless ensuring a reliable seal.

Advantageous features of the invention are indicated in the subclaims.

Preferably, the fixed control disc has a plurality of control openings which are arranged approximately symmetrically about the axis of the disc and are in communication with the outlet. This has the advantage that the rotatable control disc does not experience any canting moments. This in turn makes it possible to select the cylinder bore and the piston of the biasing device to be short in the axial direction, which is advantageous with regard to a small overall height for the disc valve as a whole.

Preferably, the piston acts on the rotatable control disc via a universal-type joint, preferably a ball and socket joint. This has the advantage of allowing a small amount of relative movement between the rotatable control disc and the piston. It is not necessary, therefore, to align the axis of the cylinder bore exactly with the axis of the rotatable control disc.

Preferably, at least one of the rotatable control disc and the fixed control disc consists of a basic disc body and a sealing plate inserted in the latter. Preferably, the connecting line is constructed as a housing channel. Preferably, the cylinder bore is formed by a portion or an extension of the shaft bore in which an actuating shaft which acts on the rotatable control disc is mounted. Preferably, the cylinder bore is provided in a cylindrical cover projection of a housing cover which engages the disc chamber. These features have the advantage of simplifying the manufacture of the disc valve, and minimising the expense associated with the manufacture.

Preferably, the disc valve includes a filter arranged in the connecting line. This has the advantage of making it impossible for the piston and the cylinder bore of the pressure-medium operated biasing device to be adversely affected by foreign bodies in the controlled medium.

Preferably, the side of the rotatable control disc remote from the sealing face supports a guide disc by means of a plurality of supports distributed in the circumferential direction, the distance between the mutually opposing faces of the rotatable control disc and the guide disc corresponding to the diameter of the inlet, and the space that lies between those discs representing a continuation of the inlet channel. This makes it possible to produce a robust and compact corner disc valve in a simple manner.

Preferably, the side of the rotatable control disc remote from the sealing face supports a guide disc by means of a plurality of supports distributed in the circumferential direction, the distance between the mutually opposing faces of the rotatable control disc and the guide disc corresponding to the diameter of the inlet, and the space that lies between those discs representing a continuation of the inlet channel. This has the advantage of allowing a significant sealing force to be exerted between the two control discs, even with small pressure differences.

BRIEF INTRODUCTION TO THE DRAWINGS

DESCRIPTION OF PREFERRED EMBODIMENTS

Figure 1:
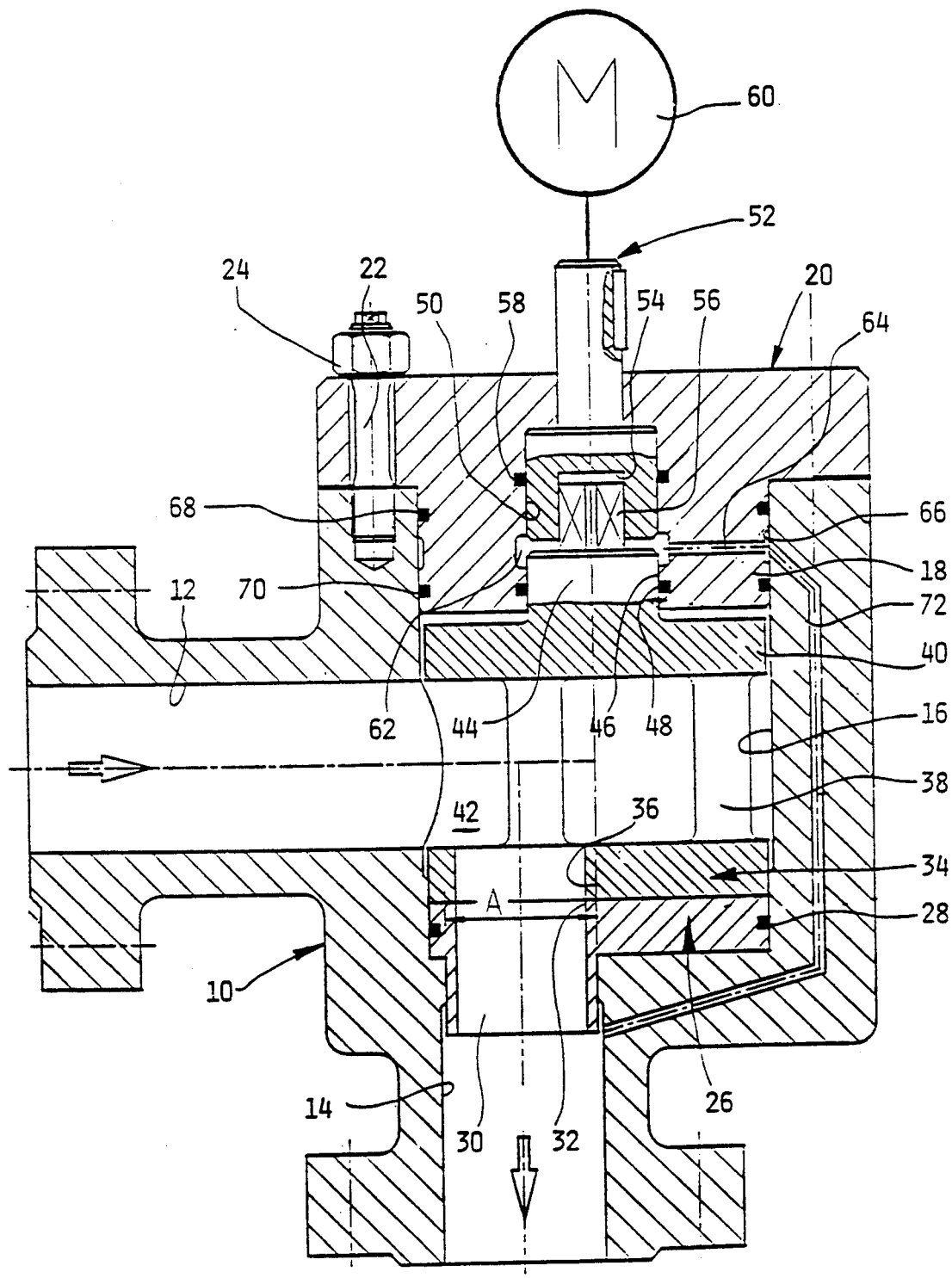
FIG. 1 shows a vertical axial section a first embodiment of corner disc valve.

The corner disc valve shown in FIG. 1 has a main housing part 10 having an inlet channel 12 and an outlet channel 14 which are arranged at right angles to each other and are in communication with the peripheral wall and the base wall, respectively, of the cylindrical disc chamber 16. The latter is defined at the top by a cylindrical cover projection 18 which forms part of a housing cover 20 which closes the main housing part 10 at the top. The housing cover 20 is screwed to the main housing part 10 by threaded bolts 22 and nuts 24.

Above the base of the disc chamber 16 sits a fixed control disc 26. The latter is sealed with respect to the peripheral wall of the disc chamber 16 by a seal 28. A socket-shaped projection 30 on the control disc 26 sits in form-fitting manner in the upper end portion of the outlet channel 14. Provided coaxially therewith in the control disc 26 is a control opening 32 of circular cross-section.

The upper face of the control disc 26 has been machined to a high smoothness and a low roughness and cooperates with a correspondingly machined lower face of a rotatable control disc 34. The latter is provided with a control opening 36 the diameter of which is the same size as that of the control opening 32 and the distance of which from the axis of the disc is the same as that of the control opening 32. The two control openings 32, 36 can be moved into an aligned position which is shown in FIG. 1 and in which they form an uninterrupted through-channel.

By means of a plurality of integrally formed-on supports 38 distributed in the circumferential direction the control disc 34 supports an upper guide disc 40 which is rotatable in the disc chamber 16 with radial clearance. As will be seen from FIG. 1, the upper side of the control disc 34 and the lower side of the guide disc 40 are respectively flush with the lowest and the highest point of the inlet channel 12, so that the space between the control disc 34 and the guide disc 40 forms a distributing space 42 located in an extension of the inlet channel 12.

A short piston 44 is integrally formed on the upper side of the guide disc 40, which piston extends in a central cylinder bore 46 in the cover projection 18 and is sealed with respect to that bore by a sealing ring 48. Aligned with the cylinder bore 46 is a shaft bore 50 in which there extends a short actuating shaft 52 having a re- entrant driving hole 54 of square cross-section at its lower end. Arranged displaceably in the latter is a square 56 which is integrally formed on the upper face of the piston 44. A seal 58 seals the shaft bore 50 with respect to the cylindrical outer surface of the actuating shaft 52. A continuously operating drive or a step motor 60, which is shown merely diagrammatically in FIG. 1, is provided as the drive for the actuating shaft 52.

Between the cylinder bore 46 and the shaft bore 50, an annular groove 62 projects radially outward. The annular groove 62 is in communication via at least one radial supply channel 64 of the cover projection 18 with a supply groove 66 which is cut into the outer surface of the cover projection 18. Seals 68, 70 arranged on both sides of the supply groove 66 seal the supply groove 66 with respect to the atmosphere and the disc chamber 16, respectively.

The supply groove 66 is radially in alignment with a connecting channel 72 which is formed in the peripheral wall of the main housing part 10 and is in communication with the outlet channel 14.

As will be seen from the drawings, the unit formed by the rotatable control disc 34, the guide disc 40 and the piston 44 is not fixed axially in the valve housing but, rather, can be moved in the axial direction by a small distance.

When the disc valve is closed or open, under normal operating conditions the inlet pressure is greater than the outlet pressure, so that by applying pressure to the upper side of the control disc 34 a net pressing force in the direction towards the fixed control disc 26 is obtained for the movable control disc 34.

If the disc valve is closed, the pressure at the outlet is passed via the connecting channel 72, the supply groove 66 and the supply channel 64 to the face of the piston 44. The square-driver connection between the drive opening 54 and the square 56 is not sealed to pressure medium as a rule, so that the face of the square 56 belongs to the pressure-loaded surface area of the piston 44. Where appropriate, this may be ensured by grooves in the outer surface of the square 56 or in the inner surface of the driver 54.

The total pressure-loaded surface area of the piston 44 is so selected that it is slightly smaller than the pressure-loaded surface area of the rotatable control disc 34 which is acted upon by the outlet pressure via the control opening 32 in the fixed control disc 26. A net biasing force in the direction towards the fixed control disc 26 is thus obtained for the rotatable control disc 34.

Figure 2:
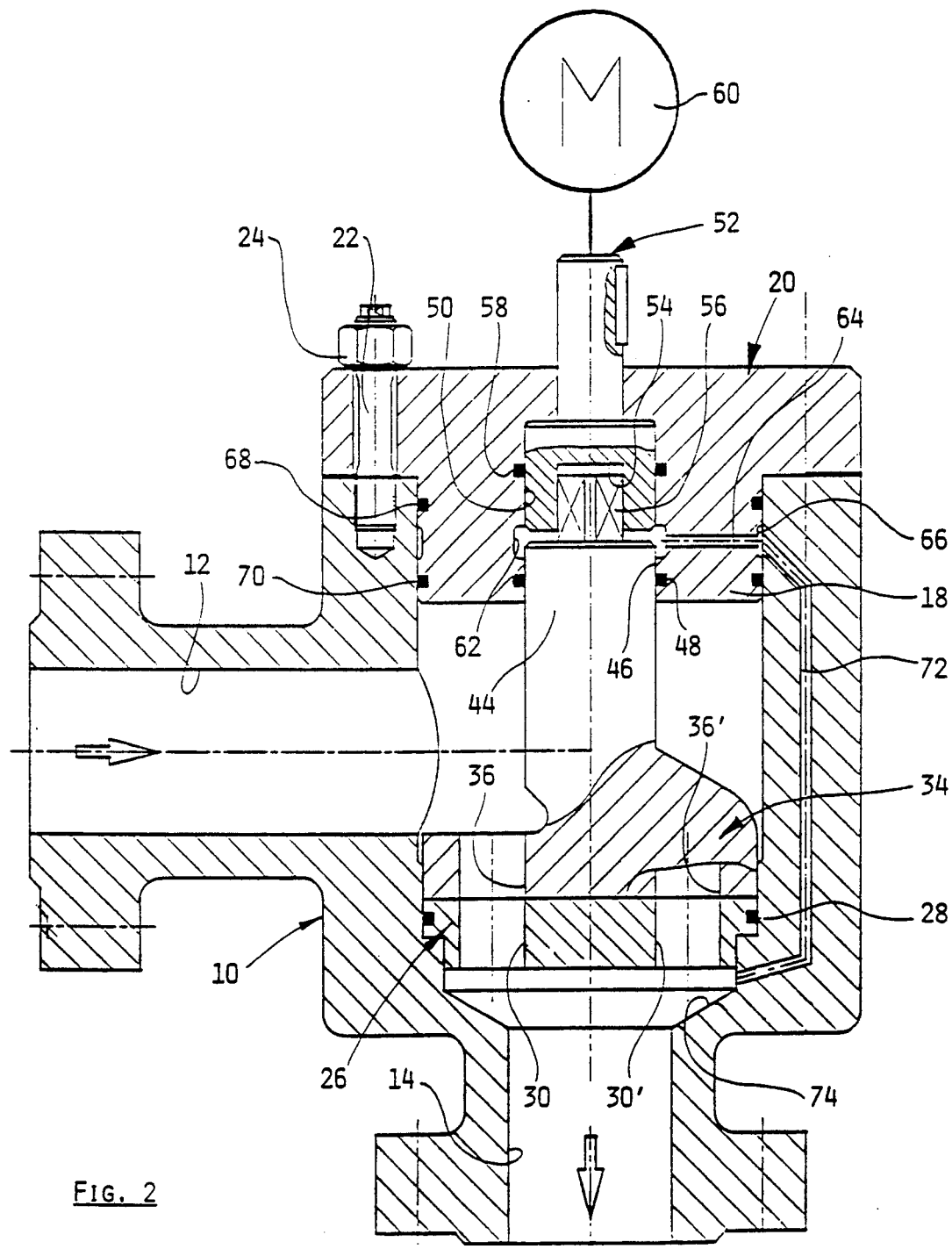
FIG. 2 shows a vertical axial section a second embodiment of corner disc valve.
Figure 3:
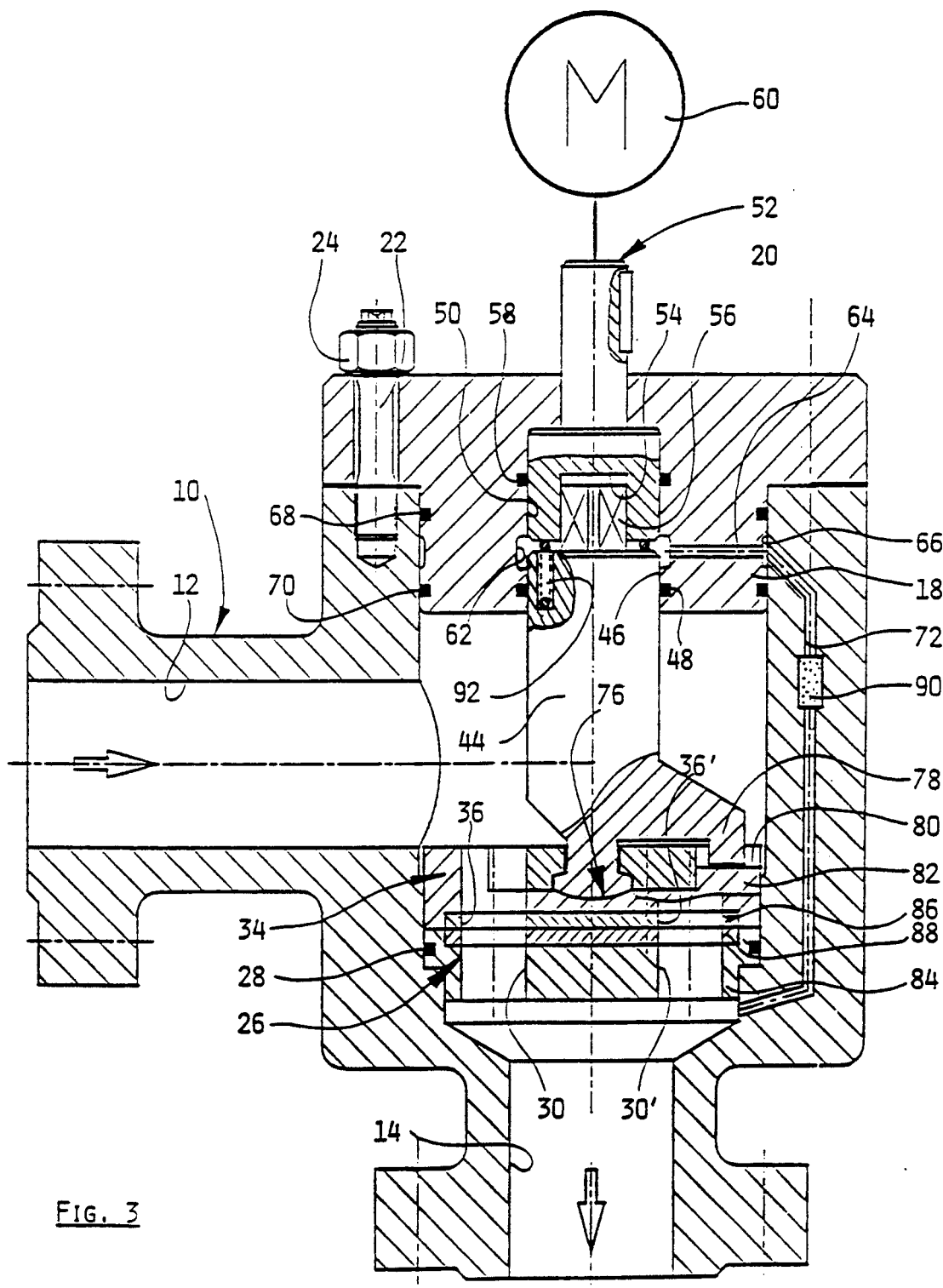
FIG. 3 shows a vertical axial section a third embodiment of corner disc valve.

In the illustrative embodiments shown in FIGS. 2 and 3, parts of the valve that are equivalent in their function to those already described above are given the same reference numerals. Those valve parts, therefore, also do not need to be described in detail again.

In the disc valve shown in FIG. 2, the fixed control disc 26 is provided with two diametrically opposing control openings 32, 32' both of which are in communication in like manner with a goblet-shaped end portion 74 of the outlet channel 14. When the control disc 34 is in the closed position, therefore, no canting moment is exerted overall on the control disc and, accordingly, no canting moment acts on the piston 44. The cylinder bore 46 can therefore be selected to be short in the axial direction without any risk of the piston 44 becoming jammed in the cylinder bore 46.

In the illustrative embodiment shown in FIG. 2, the effective pressure-loaded surface area of the piston 44 is slightly smaller than the sum of the cross-sections of the two control openings 32 and 32' so that, once again, an axial net pressing force is obtained.

For neutralising the canting moment it is not necessary per se for the rotatable control disc 34 also to be constructed with two control openings 36, 36' as shown in FIG. 2. With a view to having as high a flow rate as possible through the valve in the open position, however, the number and geometry of the control openings in the rotatable control disc 34 is preferably the same as that of the fixed control disc 26.

In the illustrative embodiment shown in FIG. 3, the piston 44 is not connected to the rotatable control disc 34 rigidly but, rather, acts on the control disc in the axial direction via a ball and socket joint generally designated 76. At the lower end of the piston 44 a driving finger 78 is integrally formed on which engages a corresponding driving groove 80, which is open at the top, in the upper side of the control disc 34. As a result of the described arrangement of the connection between piston and rotatable control disc it is possible to accommodate slight production errors.

A second difference of the illustrative embodiment shown in FIG. 3 from those described above is that the control discs each consist of a basic body 82 and 84, respectively, and sealing plates 86, 88 inserted therein.

In the disc valve shown in FIG. 3, a filter 90 is also inserted in the connecting channel 72, which filter keeps any foreign bodies in the controlled medium away from the cylinder bore 46.

Finally, a helical spring 92 is provided which is supported on the actuating shaft 52 and acts on the piston 44. A pressing of the rotatable control disc 34 against the fixed control disc 26 is thus obtained also in the pressureless state and in different mounting positions.

What is claimed is:
1. A disc valve, which comprises:
   (a) a housing having an inlet and an outlet, and having formed in it a disc chamber in communication with the inlet and the outlet,
   (b) fixed and rotatable control discs which are arranged in the disc chamber, the discs being in contact with one another via cooperating sealing faces and each of the control discs being provided with at least one control opening, the control openings of the two control discs being continuously adjustable between an aligned open position and a non-aligned closed position, (c) a device for biasing the rotatable control disc towards the fixed control disc, the biasing device comprising: (i) a piston which acts on the side of the rotatable control disc remote from the sealing face and which extends in a cylinder bore of the housing, and (ii) a connecting line which connects an operating space of the biasing device, defined by the cylinder bore and the piston, to the outlet of the housing.

2. A disc valve as claimed in claim 1, in which the pressure-loaded face of the piston substantially corresponds to, and preferably is slightly smaller than, the overall area of the control openings in the fixed control disc.

3. A disc valve as claimed in claim 1, in which the pressure-loaded face of the piston is slightly smaller than, the overall area of the control openings in the fixed control disc.

4. A disc valve as claimed in claim 1, in which the fixed control disc has a plurality of control openings which are arranged approximately symmetrically about the axis of the disc and are in communication with the outlet.

5. A disc valve as claimed in claim 4, in which the geometry and arrangement of the control openings in the rotatable control disc corresponds to that of the fixed control disc.

6. A disc valve as claimed in claim 1, in which the piston acts on the rotatable control disc via a universal-type joint.

7. A disc valve as claimed in claim 6, in which the piston acts on the rotatable control disc via a ball and socket joint.

8. A disc valve as claimed in claim 1, in which at least one of the rotatable control disc and the fixed control disc consists of a basic disc body and a sealing plate inserted in the latter.

9. A disc valve as claimed in claim 1, in which the connecting line is constructed as a housing channel.

10. A disc valve as claimed in claim 1, in which the cylinder bore is formed by a portion or an extension of the shaft bore in which an actuating shaft which acts on the rotatable control disc is mounted.

11. A disc valve as claimed in claim 1, in which the cylinder bore is provided in a cylindrical cover projection of a housing cover which engages the disc chamber.

12. A disc valve as claimed in claim 1, which includes a filter, arranged in the connecting line.

13. A disc valve as claimed in claim 1, in which the side of the rotatable control disc remote from the sealing face supports a guide disc by means of a plurality of supports distributed in the circumferential direction, the distance between the mutually opposing faces of the rotatable control disc and the guide disc corresponding to the diameter of the inlet, and the space that lies between those discs representing a continuation of the inlet channel.

14. A disc valve as claimed in claim 1, which further includes a spring by which the rotatable control disc is pressed against the fixed control disc.

* * * * *